US009325225B2

(12) United States Patent
    Silander

(10) Patent No.: US 9,325,225 B2
(45) Date of Patent: Apr. 26, 2016

(54) ROTATING ELECTRICAL MACHINE

(71) Applicant: ABB Technology AG, Zürich (CH)

(72) Inventor: Eino Silander, Klaukkala (FI)

(73) Assignee: ABB TECHNOLOGY AG, Zurich (CH)

( * ) Notice: Subject to any disclaimer, the term of this patent is extended or adjusted under 35 U.S.C. 154(b) by 57 days.

(21) Appl. No.: 14/288,426

(22) Filed: May 28, 2014

(65) Prior Publication Data

US 2014/0266080 A1      Sep. 18, 2014

Related U.S. Application Data

(63) Continuation of application No. PCT/FI2011/051051, filed on Nov. 28, 2011.

(51) Int. Cl.
| | |
|---|---|
| H02P 9/10 | (2006.01) |
| H02P 9/14 | (2006.01) |
| H02K 11/04 | (2006.01) |
| H02P 9/30 | (2006.01) |
| H02P 11/00 | (2006.01) |
| H02H 7/06 | (2006.01) |
| H02P 9/00 | (2006.01) |

(52) U.S. Cl.
    CPC .............. H02K 11/042 (2013.01); H02P 9/14 (2013.01); H02P 9/302 (2013.01)

(58) Field of Classification Search
    USPC ...................................................... 322/59, 28
    See application file for complete search history.

(56) References Cited

U.S. PATENT DOCUMENTS

| | | | | |
|---|---|---|---|---|
| 3,612,981 A | 10/1971 | Heller et al. | | 322/27 |
| 3,671,850 A | 6/1972 | Mehnert et al. | | 322/28 |
| 3,673,489 A * | 6/1972 | Riff | | H02J 7/247 322/28 |
| 3,908,161 A * | 9/1975 | Messenger | | H02K 19/00 290/38 R |
| 4,032,835 A * | 6/1977 | Finnell | | H02P 9/36 322/19 |
| 4,152,636 A * | 5/1979 | Gorden | | H02P 9/123 322/25 |
| 4,477,767 A * | 10/1984 | Cotzas | | H02K 19/28 310/198 |

(Continued)

FOREIGN PATENT DOCUMENTS

| | | |
|---|---|---|
| JP | 07-264896 A | 10/1995 |
| JP | 09-135557 A | 5/1997 |
| WO | WO 00/67355 A1 | 11/2000 |

OTHER PUBLICATIONS

International Search Report (PCT/ISA/210) mailed on Oct. 9, 2012, by the European Patent Office as the International Searching Authority for International Application No. PCT/FI2011/051051.

(Continued)

*Primary Examiner* — Pedro J Cuevas
(74) *Attorney, Agent, or Firm* — Buchanan Ingersoll & Rooney PC

(57) ABSTRACT

A rotating electric machine and a method of magnetizing a rotor of a brushless rotating electric machine are disclosed, the method including forming a stationary magnetic field, rotating a rotor of a magnetizing machine in the stationary magnetic field for producing alternating current, rectifying the alternating current with a controllable bridge situated in the rotor, receiving control instructions wirelessly to the rotor, controlling a magnitude of current with the controllable bridge based on the control instructions, and feeding the controlled current to the magnetizing winding of the rotating electric machine.

12 Claims, 2 Drawing Sheets

(56) References Cited

U.S. PATENT DOCUMENTS

| | | | | |
|---|---|---|---|---|
| 4,496,897 A * | 1/1985 | Unnewehr | H02K 19/30 | 322/25 |
| 4,636,705 A * | 1/1987 | Bowman | H02J 7/245 | 307/110 |
| 4,682,068 A * | 7/1987 | Cotzas | H02K 9/19 | 310/176 |
| 4,839,575 A * | 6/1989 | MacFarlane | H02P 9/10 | 322/25 |
| 5,012,148 A * | 4/1991 | Vithayathil | H02K 19/26 | 310/162 |
| 6,239,582 B1 * | 5/2001 | Buzan | H02J 7/1492 | 320/137 |
| 6,362,588 B1 | 3/2002 | Umans et al. | 318/521 | |
| 6,731,081 B2 * | 5/2004 | Kusase | H02K 1/2773 | 318/140 |
| 7,102,304 B2 * | 9/2006 | Sebille | F02N 11/04 | 180/65.1 |
| 7,265,463 B2 * | 9/2007 | Kusase | F04D 29/582 | 310/58 |
| 7,365,519 B2 * | 4/2008 | Gibbs | H02P 9/10 | 322/28 |
| 7,687,928 B2 * | 3/2010 | Taneja | F01D 15/10 | 290/31 |
| 7,969,123 B2 * | 6/2011 | Crane | H02K 19/26 | 322/59 |
| 2006/0226815 A1 * | 10/2006 | Gibbs | H02P 9/30 | 322/28 |
| 2011/0227544 A1 * | 9/2011 | Crane | H02K 19/26 | 322/59 |
| 2011/0298430 A1 * | 12/2011 | Platero Gaona | H02P 9/10 | 322/59 |
| 2014/0210426 A1 * | 7/2014 | Terada | H02P 9/08 | 322/59 |

OTHER PUBLICATIONS

Written Opinion (PCT/ISA/237) mailed on Oct. 9, 2012, by the European Patent Office as the International Searching Authority for International Application No. PCT/FI2011/051051.

Office Action issued on Jul. 28, 2015, by the Japanese Patent Office in corresponding Japanese Patent Application No. 2014-542909 and an English translation of the Office Action. (9 pages).

* cited by examiner

ROTATING ELECTRICAL MACHINE

FIELD

The present disclosure relates to rotating electric machines, and, for example, to excitation of rotating electric machines.

BACKGROUND INFORMATION

The operation of rotating electrical machines, such as motors and generators, is based on magnetic interaction between a stator and a rotor of the machine. Generally magnetization of the poles of the stator and the rotor can be carried out by using permanent magnet pieces or by using windings carrying current. In general, in the case of synchronous machines, the stator comprises the windings and the rotor poles are magnetized either by using permanent magnets or current carrying windings. When a synchronous machine is used as a generator, the rotor is rotated by mechanical power and a rotating magnetic field induces voltage to stator windings. When the synchronous machine is used as a motor, an alternating current produces a rotating magnetic field into the stator and the magnetized rotor follows the movement of the field and thereby rotates with the rotating magnetic field.

The use of electrical magnetization or field coils in the rotor has the advantage that the magnetization can be controlled by controlling the current fed to the rotor poles. This current is referred to as a field magnetizing current, excitation current or rotor current. The purpose of this current is to produce the required magnetic field to the rotating rotor.

Field magnetization can be produced using either brushless magnetization or magnetization with brushes. In the magnetization with brushes, the current is fed from a stationary power source to the rotating rotor by using brushes that carry the current from a stationary side to the rotating rotor.

FIG. 1 shows a basic structure used in brushless magnetization. In the brushless magnetization, a magnetizing machine or an exciter is used for producing a magnetizing current $I_R$ to a field winding 3 of the main machine. A rotor winding 1 of the magnetizing machine rotates together with the rotor of the main machine while a stator winding 2 of the exciter is energized by an excitation current $I_m$. A current generated to the rotating winding is rectified with a diode bridge, and the rectified current, i.e. the rotor current $I_R$, is further fed to the field winding 3. The rotor current $I_R$ is thus controlled indirectly by controlling the excitation current $I_m$.

FIG. 1 also shows the rotating parts as a dotted box 5 and a device 6 used for controlling the magnetizing current. This device is generally referred to as an AVR (automatic voltage regulator). AVR receives multiple inputs (not shown) and controls the magnetization of the machine according to the inputted signals. FIG. 1 further shows stator windings 7 of the main machine from which a three phase U, V, W voltage is obtainable when the machine in question is a generator.

With the above brushless excitation, the structure of the machine can be quite complicated owing to the controlled magnetizing current. The AVR contains a power stage that is capable of producing currents in the range of tens of amperes. The power stage has a certain amount of losses and the whole AVR system is large. Further, the AVR system involves a separate power supply, e.g. transformers, a pilot exciter and so on, increasing the complexity and space required by the system.

SUMMARY

A rotating electric machine with brushless excitation is disclosed, comprising: a main electric machine; an excitation machine whose rotor is configured to rotate with a rotor of the main electric machine and produce magnetizing power for the main electric machine; a rotating rectifier bridge electrically connected to the excitation machine for feeding a field magnetization current ($I_R$) to a rotor winding of the main electric machine, the rotating rectifier bridge being a controlled rectifier bridge having controllable semiconductor components for controlling the field magnetization current ($I_R$); and a rotor control unit connected to the rotating rectifier bridge and being configured to control controllable semiconductor components, wherein the rotor control unit is configured to receive control instructions wirelessly.

A method of magnetizing a rotor of a brushless rotating electric machine is also disclosed, the method comprising: forming a stationary magnetic field; rotating a rotor of a magnetizing machine in the stationary magnetic field for producing alternating current; rectifying the alternating current with a controllable bridge situated in the rotor; receiving control instructions wirelessly to the rotor; controlling a magnitude of current with the controllable bridge based on the control instructions; and feeding the controlled current to a magnetizing winding of the rotating electric machine.

BRIEF DESCRIPTION OF THE DRAWINGS

In the following, features will be described in greater detail by reference to preferred embodiments and with reference to the accompanying drawings, in which.

DETAILED DESCRIPTION

A method and a machine for implementing the method are disclosed which are based on the idea of using a controlled bridge in the rotor of the machine such that the rotor current is controlled directly. The controlled bridge is controlled with a control unit located in the rotating rotor, and it receives control information wirelessly from a stationary unit, such as an AVR.

An advantage of the method and arrangement disclosed herein is that no separate excitation current is needed and the use of the power stage in an AVR unit can be avoided. This greatly reduces the size and power rating of the AVR unit.

Since no controlled excitation current is used, the exciter can be magnetized using permanent magnets in the stator of the exciter. The size and amount of permanent magnets can be dimensioned accurately.

According to an exemplary embodiment, the data transmission between the rotor control unit and the AVR unit is bidirectional, i.e. the rotor control unit can also communicate wirelessly to the stationary AVR unit. This enables measurement information to be received directly from the rotating rotor, which has been impossible previously.

Figure 1:
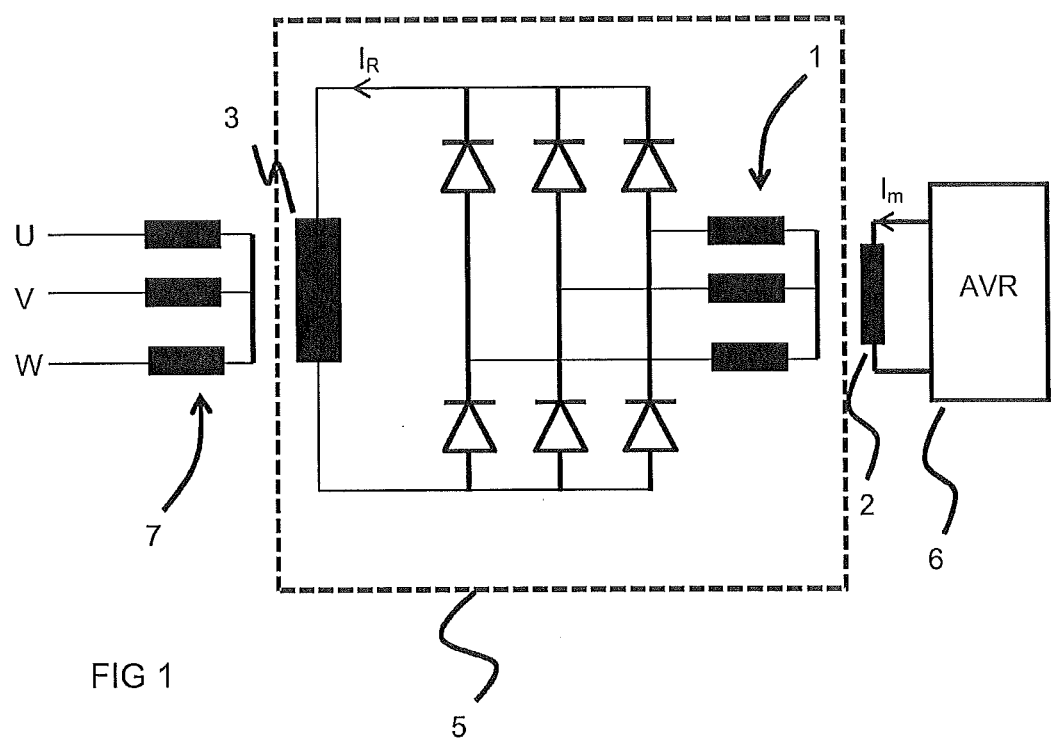
FIG. 1 shows a known system for magnetizing a rotor of an electric machine.
Figure 2:
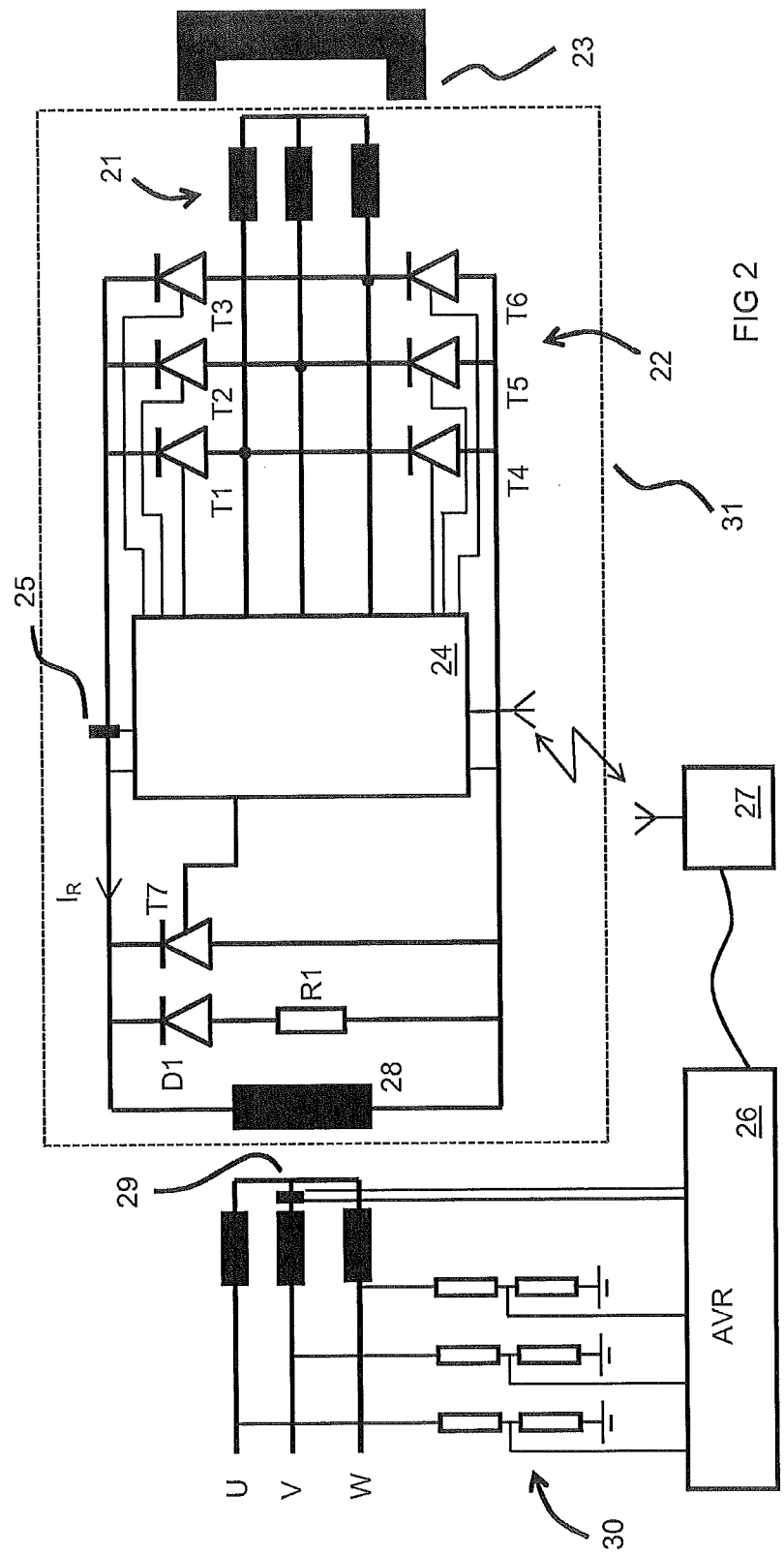
FIG. 2 shows a basic structure of a magnetization system according to an exemplary embodiment disclosed herein.

FIG. 2 shows a main circuit structure of a magnetization system according to an embodiment. A rotating electric machine is provided with brushless excitation. This is to say that the machine has no slip-rings through which rotor current is fed from a stationary current source. In the present disclosure, the magnetization of the main machine is produced by a rotor winding 21 of an excitation machine or an exciter which is rotating together with a rotor of the main electrical machine. The rotor together with the rotating parts is shown in FIG. 2 as a dashed box 31.

The current from the rotor winding of the excitation machine or the exciter is rectified so that the DC current, i.e. the field magnetization current, is fed to the rotor winding, i.e. the field winding of the main machine. In the present embodiment, the rectification is carried out using a controlled rectifying bridge 22 consisting of thyristors T1 to T6. In this embodiment, the rotor 21 of the auxiliary machine has three phases and therefore the rectifying bridge has three pairs of rectifying components.

The rotor of the machine can further include a rotor control unit 24 which controls the switch components of the bridge. A rotor control unit is connected to the phases of the exciter from which the unit receives its operating voltage. Alternatively, the control unit is energized by an auxiliary coil. When the operation of the machine is started, the rotor control unit is powerless. Once the rotor of the machine starts rotating, the exciter produces voltage, and this voltage is used as an operating voltage of the rotor control unit.

As the rotor control unit is arranged in the rotor, control instructions from an AVR to the rotor control unit are transmitted using wireless transmission. The actual values of rotor quantities, e.g. rotor voltage $U_R$ and current $I_R$, are also sent wirelessly back to the AVR. The rotor control unit measures the rotor current by a current measurement means 25 which can be for example a shunt measurement or a Hall-element or the like.

The current $I_R$ is regulated by means of the thyristors T1 to T6, which are controlled by the rotor control unit according to the signals sent from an AVR unit 26.

The AVR unit 26 and its function are similar to the known structures, with the exception that the AVR unit used in the invention has no power stage for producing the actual excitation current. FIG. 2 shows a transmitting device 27 connected to the AVR unit. The signals from this transmitter 27 are received by the rotor control unit 24. The rotor control unit can include suitable means for receiving the signals. The wireless transmission may be carried out using any known wireless transmission method and devices. Examples of applicable transmission types include the use of bluetooth wireless technology, infrared technology, RF technology or the like. The transmission of information may also be carried out using a completely structure-specific arrangement which may include for example the use of coils wound on the poles of the exciter.

In the present disclosure, the excitation response and accuracy are better than in the traditional brushless excitation. This is because the rotor current is controlled directly and not by controlling the excitation current Im. The excitation response is increased to the extent that generated power can be stabilized more accurately than before. This feature may also be utilized in a so-called power stability system (PSS).

A stator 23 of the exciter is for example to be magnetized using permanent magnets. The amount of specified permanent magnets can be calculated or defined experimentally in the test field. Further, the design of the stator can be made compact with the permanent magnets. The specified rotor current fed to a magnetizing winding is known and therefore the magnetizing machine can be designed to supply this current. The amount of permanent magnets can be set such that the specified short-circuit current can be obtained.

The use of permanent magnets can be preferred since large and specific voltage transformers are not needed. Voltage transformers completed by current transformers or by a pilot exciter are required in the traditional brushless excitation for supplying power to the AVR unit.

Another approach is to magnetize the exciter by using an electrically magnetized stator. A current fed to the stator coils of the exciter can be constant since the rotor current is controlled in the rotor circuit. The constant current makes the design of the magnetizing circuit more simplified than in the use of the controlled excitation current as in the known system.

According to an embodiment, the rotor control unit 24 and the stationary AVR unit 26 are connected wirelessly in a bi-directional manner. This means that both units are adapted to both send and receive information. As already mentioned, the rotor control unit communicates, for example, the measured value of the field magnetizing current or the rotor current $I_R$ to the AVR. This feedback gives additional control possibilities in the AVR compared to the known AVR systems, e.g. to set accurate time depending max limits to the rotor current. Further, the value of the $I_R$ can be read directly from the AVR. No measuring slip-rings are needed in the test field, for example.

The bi-directional transmission of information has many other uses. In known systems, the actual values of currents and voltages in the rotor circuit have been unknown. The transmission of information enables measured rotor currents and voltages to be transmitted from the rotor to the stationary AVR unit. In the known systems, the type testing of large generators has been carried out by placing slip rings in the rotor just for the purpose of testing the generator. Thus the bi-directional data transmission is also useful prior to the actual use of the machine.

The measured values communicated to the stationary unit 26 may include different temperature values measured from the windings or from the bridge, the rotor current being measured with measurement means 25 and voltage over the magnetizing winding, which can be measured using a simple voltage divider, for example. Other communicated signals may be for example earth fault signals and signals indicating faults in thyristors or other semiconductor components.

For the purposes of machine safety, the AVR unit may repeatedly contact the rotor control unit for ensuring that the communication path between the units is in good condition. This can be carried out either by repeatedly sending polls to which the rotor control unit responds or by sending reference values to the rotor control unit although the reference stays constant. The rotor control unit may have a function according to which the machine is shut down if transmissions are not received from the AVR unit in a predetermined time interval. Further, the protection may be carried out such that the rotor control unit supervises the received instructions. If the instructions do not meet certain criteria, the rotor control unit shuts down the controlled bridge.

According to an embodiment, the rotor circuit can further include a controllable circuit for lowering the magnetization of the rotor winding of the main electrical machine. FIG. 2 shows a series connection of a diode D1 and resistor R1 connected in parallel with the magnetizing winding and a controlled semiconductor component T7 connected in parallel with the series connection. The controlled component, such as a thyristor T7, is controlled by the rotor control unit. When the magnetization of a magnetizing winding 28 is to be lowered quickly, the rotor control unit 24 sets the thyristor T7 into a blocking state. The magnetic field of the winding is then decreased rapidly when the rotor current from the winding is forced through the series connection of the resistor R1 and the diode D1.

FIG. 2 also shows the stator windings of the main electric machine. When the electric machine is a generator, a voltage is induced to the windings and this voltage forms a three-phase voltage having phases U, V, W. A current measurement 29 for the AVR 26 is arranged in connection with the stator windings. FIG. 2 also shows voltage sensors 30 measuring the voltages of the phases by using resistive voltage dividers. The current and voltage information is used in the AVR 26 for further controlling the machine in a desired manner.

Brushlessly excited machines have been used as generators for high powers for producing a three-phase voltage that is supplied to a medium or high voltage grid. However, the power rating of the machine described herein is not limited to any specific powers.

It would be apparent to a skilled person in the art that the electric machine disclosed herein may use different types of semiconductor components in the rotor circuit. FIG. 2 shows the components as thyristors, but the type is not limited to any specific type. Similarly, the wireless transmission of information between the rotating rotor control unit and the stationary AVR is not limited to the examples described herein. The transmission may be carried out using any wireless method and protocol suitable for use in the system.

It will be apparent to a person skilled in the art that, as technology advances, the inventive concept can be implemented in various ways. The invention and its embodiments are not limited to the examples described above but may vary within the scope of the claims.

As such, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotating electric machine with brushless excitation, comprising:
    a main electric machine;
    an excitation machine whose rotor is configured to rotate with a rotor of the main electric machine and produce magnetizing power for the main electric machine;
    a rotating rectifier bridge electrically connected to the excitation machine for feeding a field magnetization current ($I_R$) to a rotor winding of the main electric machine, the rotating rectifier bridge being a controlled rectifier bridge having controllable semiconductor components for controlling the field magnetization current ($I_R$);
    a rotor control unit connected to the rotating rectifier bridge and being configured to control controllable semiconductor components, wherein the rotor control unit is configured to receive control instructions wirelessly; and
    a controllable circuit adapted to lower the magnetization of the rotor winding of the main electric machine, wherein the controllable circuit comprises:
        a series connection of a diode and a resistor connected in parallel with a rotor winding of the main electric machine; and
        a controllable semiconductor component connected in parallel with the series connection, the rotor control unit being configured to control the controllable semiconductor component.

2. A rotating electric machine according to claim 1, wherein the excitation machine comprises:
    rotating windings adapted to be rotated in a stationary magnetic field for producing the magnetizing power to the main electric machine.

3. A rotating electric machine according to claim 2, wherein the stationary magnetic field is produced by permanent magnets.

4. A rotating electric machine according to claim 2, wherein the stationary magnetic field is produced with coils magnetized with DC current.

5. A rotating electric machine according to claim 1, wherein the rotor control unit is configured to both send and receive wireless transmissions.

6. A rotating electric machine according to claim 1, wherein the rotor control unit is configured to measure one or more quantities of a rotor circuit, the quantities including voltage of a field magnetization winding, field magnetization current, and various temperatures.

7. A rotating electric machine according to claim 6, wherein the rotor control unit is configured to transmit wirelessly one or more of the measured quantities to an automatic voltage regulator.

8. A rotating electric machine according to claim 4, comprising:
    a controllable circuit adapted to lower the magnetization of the rotor winding of the main electric machine.

9. A rotating electric machine according to claim 3, wherein the rotor control unit is configured to both send and receive wireless transmissions.

10. A rotating electric machine according to claim 8, wherein the rotor control unit is configured to both send and receive wireless transmissions.

11. A rotating electric machine according to claim 9, wherein the rotor control unit is configured to measure one or more quantities of a rotor circuit, the quantities including voltage of a field magnetization winding, field magnetization current, and various temperatures.

12. A rotating electric machine according to claim 10, wherein the rotor control unit is configured to measure one or more quantities of a rotor circuit, the quantities including voltage of a field magnetization winding, field magnetization current, and various temperatures.

\* \* \* \* \*